United States Patent
Cho et al.

(10) Patent No.: US 11,015,810 B2
(45) Date of Patent: May 25, 2021

(54) COMBUSTOR NOZZLE ASSEMBLY AND GAS TURBINE HAVING THE SAME

(71) Applicant: DOOSAN HEAVY INDUSTRIES & CONSTRUCTION CO., LTD., Changwon-si (KR)

(72) Inventors: Moonsoo Cho, Seoul (KR); Junhyeong Park, Seo-gu (KR)

( * ) Notice: Subject to any disclaimer, the term of this patent is extended or adjusted under 35 U.S.C. 154(b) by 388 days.

(21) Appl. No.: 15/714,800

(22) Filed: Sep. 25, 2017

(65) Prior Publication Data

US 2018/0299130 A1    Oct. 18, 2018

(30) Foreign Application Priority Data

Apr. 18, 2017    (KR) .................. 10-2017-0049623

(51) Int. Cl.
*F23R 3/28* (2006.01)
*F23R 3/26* (2006.01)
*F02C 3/04* (2006.01)

(52) U.S. Cl.
CPC .............. *F23R 3/286* (2013.01); *F23R 3/26* (2013.01); *F02C 3/04* (2013.01); *F05D 2220/32* (2013.01); *F05D 2240/35* (2013.01)

(58) Field of Classification Search
CPC .... F23R 3/286; F23R 3/26; F23R 3/28; F02C 3/04; F05D 2220/32; F05D 2240/35; B05B 1/046; F24F 6/14; F24F 2013/0612
USPC ................ 123/205; 60/737; 239/559, 567; 454/55, 154, 236, 306
See application file for complete search history.

(56) References Cited

U.S. PATENT DOCUMENTS

| | | | | |
|---|---|---|---|---|
| 5,251,447 A | * | 10/1993 | Joshi | .......... F23R 3/14 239/403 |
| 5,899,075 A | * | 5/1999 | Dean | .......... F23C 7/004 60/737 |
| 6,176,087 B1 | | 1/2001 | Snyder et al. | |
| 2007/0107436 A1 | * | 5/2007 | Evulet | ........ F23R 3/286 60/776 |
| 2008/0110173 A1 | * | 5/2008 | Bunker | ......... F23D 14/62 60/737 |
| 2010/0180603 A1 | * | 7/2010 | Simmons | ........ F23R 3/286 60/772 |

(Continued)

FOREIGN PATENT DOCUMENTS

| | | |
|---|---|---|
| DE | 3819898 A1 | 12/1989 |
| JP | H09184629 A | 7/1997 |

(Continued)

OTHER PUBLICATIONS

A Korean Notice of Allowance dated Aug. 1, 2018 in connection with Korean Patent Application No. 10-2017-0049623 which corresponds to the above-referenced U.S. application.

*Primary Examiner* — Arun Goyal
*Assistant Examiner* — Henry Ng

(57) ABSTRACT

A combustor nozzle assembly and a gas turbine having the combustor nozzle assembly includes a nozzle casing for receiving compressed air from a compressor, a curved surface at a corner continuing from a surface of the inner surface thereof that is perpendicular to the direction of the compressed air, a fuel spray hole formed at the curved surface, and a fuel chamber having a predetermined volume and formed inside the curved surface to supply fuel into the nozzle casing through the fuel spray hole.

20 Claims, 10 Drawing Sheets

(56) References Cited

U.S. PATENT DOCUMENTS

| | | | |
|---|---|---|---|
| 2011/0131998 A1* | 6/2011 | Nadkarni | F23R 3/14 |
| | | | 60/737 |
| 2012/0111012 A1 | 5/2012 | Axelsson | |
| 2013/0180248 A1* | 7/2013 | Parsania | F23R 3/14 |
| | | | 60/737 |
| 2014/0007581 A1* | 1/2014 | Tuthill | F23R 3/14 |
| | | | 60/772 |
| 2014/0338337 A1* | 11/2014 | Prociw | F23R 3/28 |
| | | | 60/737 |
| 2015/0323187 A1* | 11/2015 | Gomez del Campo | |
| | | | F02C 7/264 |
| | | | 60/776 |
| 2019/0086093 A1* | 3/2019 | Fukuba | F23R 3/20 |

FOREIGN PATENT DOCUMENTS

| | | |
|---|---|---|
| JP | 2009192175 A | 8/2009 |
| JP | 2013504004 A | 2/2013 |
| JP | 2014052178 A | 3/2014 |
| KR | 1020140101825 A | 8/2014 |
| KR | 10-1470774 B1 | 12/2014 |
| KR | 10-1579122 B1 | 12/2015 |
| KR | 10-2017-0000793 A | 1/2017 |

\* cited by examiner

COMBUSTOR NOZZLE ASSEMBLY AND GAS TURBINE HAVING THE SAME

CROSS REFERENCE TO RELATED APPLICATION

The present application claims priority to Korean Patent Application No. 10-2017-0049623, filed Apr. 18, 2017, the entire contents of which is incorporated herein by reference.

BACKGROUND OF THE DISCLOSURE

The present disclosure relates to a combustor nozzle assembly and a gas turbine having the same and, more particularly, to a combustor nozzle assembly including a structure that improves a pre-mixing effect without a quaternary nozzle, and a gas turbine having the combustor nozzle assembly.

In general, as shown in FIG. 1, a gas turbine 1 of a related art includes a compressor 11, a combustor 12, and a turbine 13. Air flowing inside through an air inlet 20 is compressed into high-temperature and high-pressure compressed air by the compressor 11. High-temperature and high-pressure combustion gas (i.e., working fluid) is produced by combusting the compressed air by supplying fuel to the compressed air. The turbine 13 is operated by the combustion gas, and a power generator connected to the turbine is operated. The compressor 11 may be operated using some of the power output from the turbine 13. To this end, a rotating shaft of the compressor 11 may be directly coupled with a rotating shaft of the turbine 13. The combustor 12 may mix fuel with compressed air supplied from the compressor 11 and combust the mixture through an isobaric combustion process to make combustion gas having high energy.

In the gas turbine 1, gas fuel, liquid fuel, or hybrid fuel formed by a combination of them may be used. It is important to form combustion conditions suitable for reducing the amount of exhaust gas such as carbon monoxide and nitrogen oxide. A pre-mixed combustion scheme has been used increasingly because a combustion temperature can be reduced and uniform combustion is possible so that exhaust gas can be reduced. As shown in FIG. 2, a combustor 12 of a gas turbine of the related art includes a combustor casing 41, a plurality of main burners 45 disposed around a pilot burner 44, and a duct assembly 48. A pilot nozzle (not shown) is disposed in the pilot burner 44, and a main nozzle (not shown) is disposed in the main burners 45. Further, the pilot burner 44 and the main burners 45 are arranged to face a combustion chamber 43. In the pre-mixed combustion, compressed air is mixed with fuel ejected from the nozzles in advance, and then enters the combustion chamber 43. Thereafter, if combustion is stabilized, the combustion is maintained by supplying fuel and air. Referring to FIG. 2, compressed air flows along an outer surface of the duct assembly, which is coupled between the burners and the turbine 13 so that high-temperature combustion gas can flow through the duct assembly, and then is supplied toward the nozzles. A nozzle casing 46 is coupled to an end of the duct assembly 48. A head end plate (not shown) for supporting the nozzles is coupled to the nozzle casing 46. The combustor casing 41 may enclose the burners which may be disposed at a downstream side of the compressor 11 and arranged along the combustor casing 41. Fuel ejected from the nozzles is mixed with air at an appropriate ratio to form a mixture having conditions suitable for combustion. The nozzle casing 46 is configured to enclose the nozzles. One end of the nozzle casing 46 is coupled to the duct assembly 48, and the other end of the nozzle casing 46 is coupled to the head end plate.

FIG. 3 is a partial cross-sectional view showing a combustor nozzle assembly according to the related art. The combustor nozzle assembly 10 of FIG. 3 may be formed as a part in the nozzle casing 46 of the combustor 12 in FIG. 2. According to FIG. 3, A combustor nozzle casing of the combustor nozzle assembly 10 of the related art has a flat internal shape, so compressed air does not uniformly flow in a combustor fuel nozzle. Further, a separate quaternary nozzle 14 for pre-mixing is provided in the combustor nozzle casing 10 of the related art, so it is required to weld the quaternary nozzle 14. Further, the volume and thickness of the combustor nozzle casing 10 are increased due to a fuel chamber 15 that communicates with the quaternary nozzle 14. Therefore, there is a need to develop a combustor nozzle assembly that can solve the problems in the related art.

SUMMARY

An object of the present disclosure is to provide a combustor nozzle assembly having a structure that reduces the volume of a nozzle casing, improves uniformity in flow of compressed air, reduces the manufacturing cost by removing a quaternary nozzle, and improves a pre-mixing effect, and a gas turbine having the combustor nozzle assembly.

A combustor nozzle assembly according to an aspect includes a nozzle casing for receiving compressed air from a compressor, a curved surface at a corner continuing from an inner surface thereof that is perpendicular to the direction of the compressed air, a fuel spray hole formed at the curved surface, and a fuel chamber having a predetermined volume formed by the curved surface and the surface of the nozzle casing to supply fuel into the nozzle casing through the fuel spray hole.

The curved surface may be rounded with a predetermined radius of curvature at the corner.

The radius of curvature may be 10 to 50% of an inner diameter of the nozzle casing.

The fuel spray hole may be formed to face a center of the radius of curvature.

Two or more fuel spray holes may be formed along the curved surface, and the fuel spray holes may be arranged in one or more rows.

Two or more fuel spray holes having different diameters may be arranged in a predetermined pattern at the curved surface.

The fuel spray holes may include a first fuel spray hole formed at a right center of the curved surface in a vertical cross-section, and a second fuel spray hole formed close to the first fuel spray hole and having a diameter of 10 to 50% of the diameter of the first fuel spray hole.

Two or more first vortex projections having a predetermined length may be formed on an inner surface of the nozzle casing to generate a vortex of compressed air flowing through a liner.

The first vortex projections may be spaced at a predetermined angle from each other around the inner surface of the nozzle casing.

A second vortex projection having a predetermined length is formed on an inner surface of the nozzle casing that is perpendicular to the direction of the compressed air to generate a vortex of compressed air flowing through a liner.

The second vortex projection may be spirally formed toward a center.

One or more third vortex projections having a predetermined length may be formed spirally in an inflow direction of compressed air to generate a vortex of compressed air flowing through the liner.

Another aspect provides a gas turbine including a compressor, a combustor nozzle assembly, and a turbine, in which the combustor nozzle assembly includes a nozzle casing for receiving compressed air from the compressor, a curved surface formed at a corner continuing from an inner surface of the nozzle casing that is perpendicular to the direction of the compressed air, and a fuel chamber for supplying fuel into the nozzle casing through a fuel spray hole formed at the curved surface.

The fuel spray hole may be formed to face a center of the radius of curvature.

Two or more fuel spray holes may be formed around an inner surface of the nozzle casing, and the fuel spray holes may be arranged in one or more rows.

Two or more fuel spray holes having different diameters may be arranged in a predetermined pattern at the curved surface.

As described above, according to the combustor nozzle assembly of the present disclosure, a nozzle casing, fuel spray holes, and fuel chamber that are formed in a specific structure reduces the volume of a nozzle casing, improves uniformity in flow of compressed air, reduces the manufacturing cost by removing a quaternary nozzle, and improves a pre-mixing effect, and a gas turbine having the combustor nozzle assembly.

Further, according to the combustor nozzle assembly of the present disclosure, a curved surface and fuel spray holes formed at a corner continuing from an inner surface of the nozzle casing that is perpendicular to the direction of the compressed air, and a fuel chamber improve uniformity in flow of compressed air, reduce the manufacturing cost of a combustor by removing a quaternary nozzle, and improve a pre-mixing effect.

Further, according to the combustor nozzle assembly of the present disclosure, the fuel spray holes arranged in a specific direction at the curved surface and arranged in a predetermined pattern improve a pre-mixing effect.

Further, according to the combustor nozzle assembly of the present disclosure, the first fuel spray hole and the second fuel spray hole disposed at predetermined positions improve a pre-mixing effect.

Further, according to the combustor nozzle assembly of the present disclosure, first vortex projections, a second vortex projection, and third vortex projections that have specific structures improve a pre-mixing effect.

Therefore, a gas turbine of the present disclosure including the combustor nozzle assembly having a specific configuration above has low manufacturing cost and improved operational efficiency.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinafter, exemplary embodiments of the present disclosure are described in detail with reference to the drawings. The terms and words used in the present specification and claims should not be interpreted as being limited to typical meanings or dictionary definitions, but should be interpreted as having meanings and concepts relevant to the technical scope of the present disclosure.

It should be understood that when an element is referred to as being "on" another element, the elements may be in contact with each other or there may be an intervening element present. Through the present specification, unless explicitly described otherwise, "comprising" any components will be understood to imply the inclusion of other components rather than the exclusion of any other components.

Figure 1:
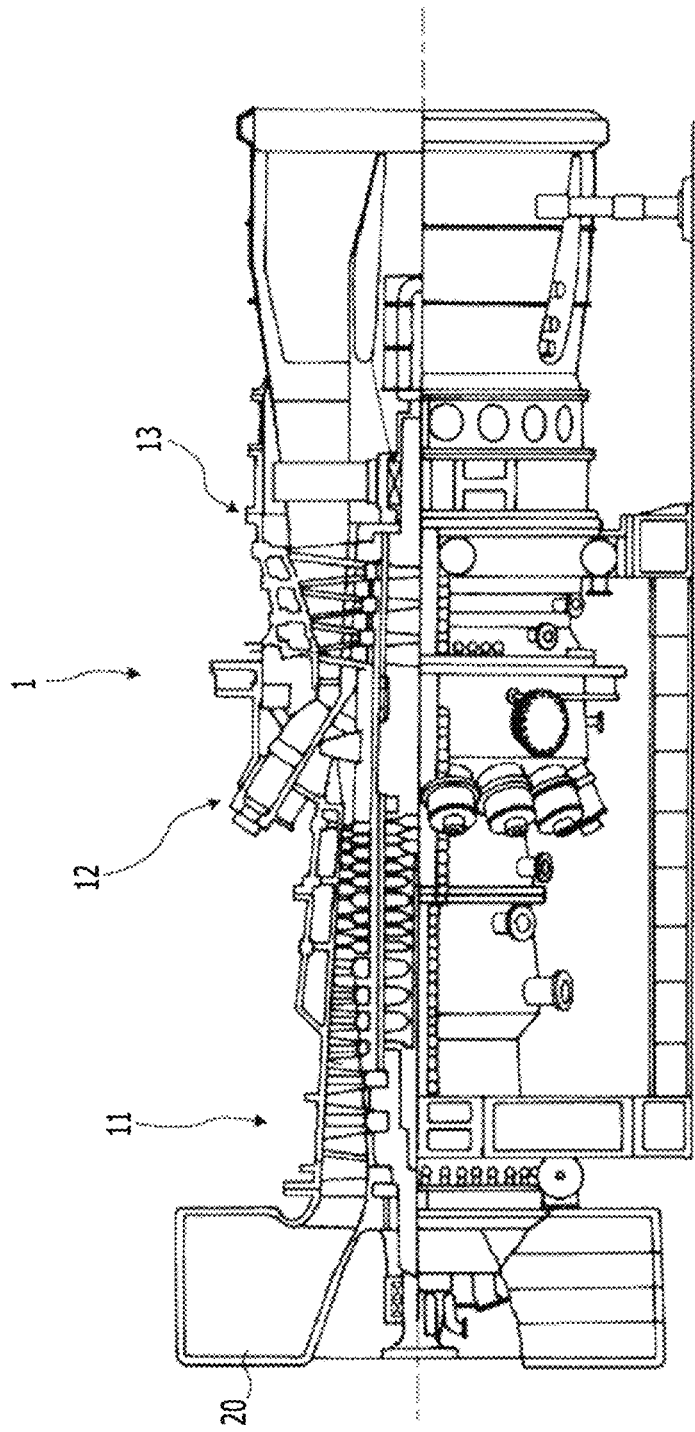
FIG. 1 is a cross-sectional view showing a gas turbine according to a related art.
Figure 2:
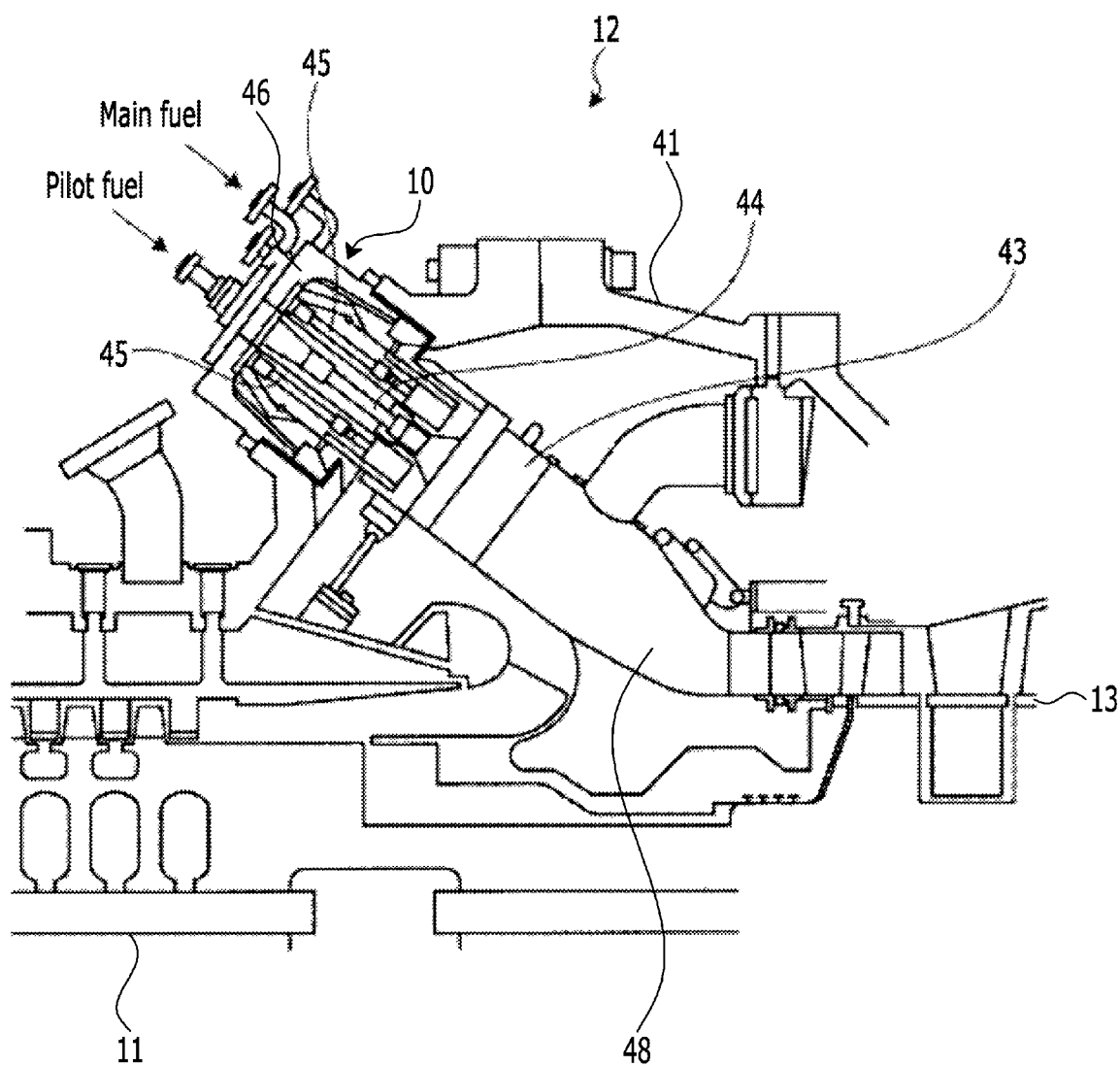
FIG. 2 is a partial cross-sectional view showing the combustor shown in FIG. 1.
Figure 3:
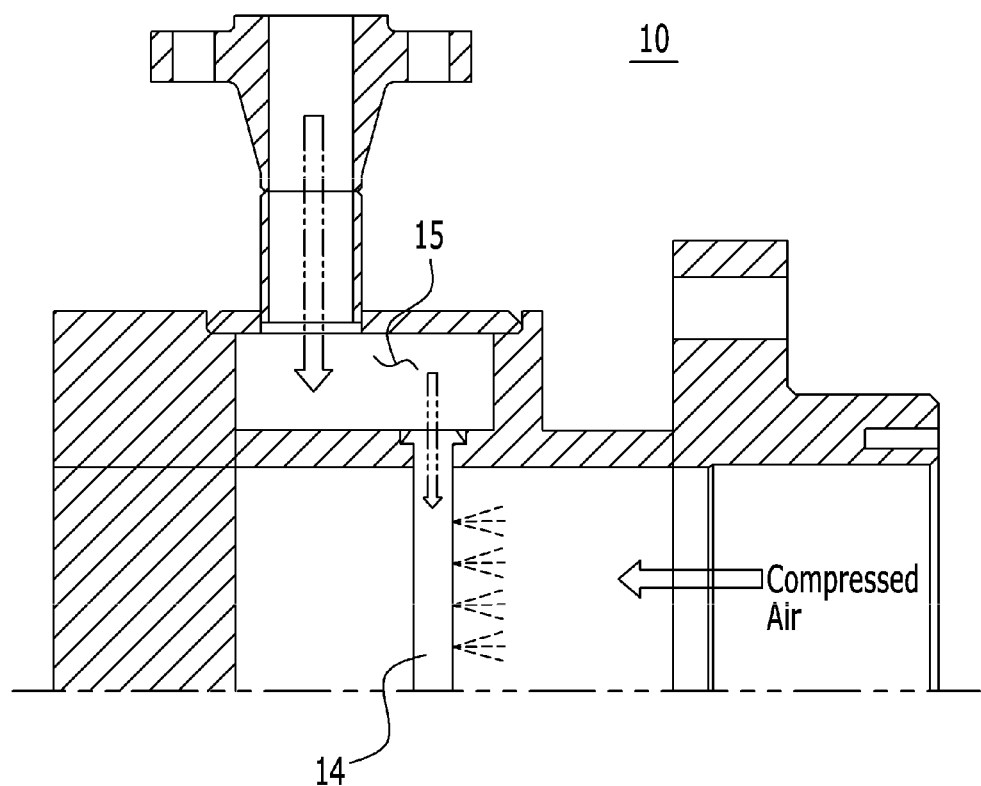
FIG. 3 is a partial cross-sectional view showing a combustor nozzle assembly according to the related art.
Figure 4:
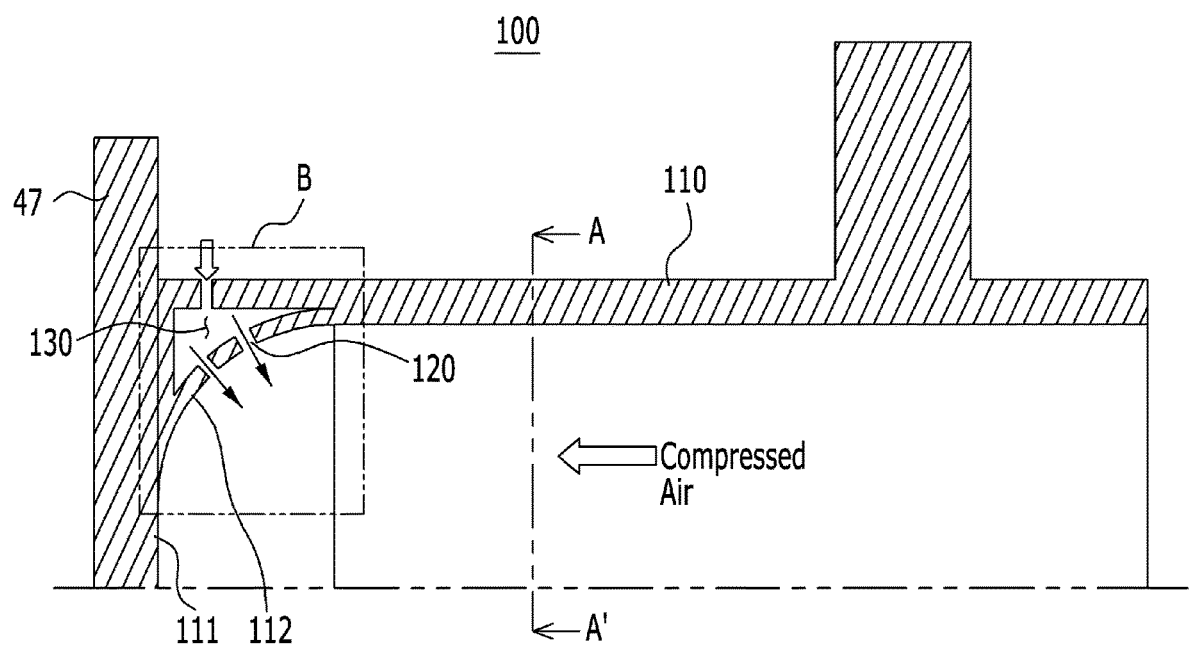
FIG. 4 is a partial cross-sectional view showing a combustor nozzle assembly according to an exemplary embodiment.
Figure 5:
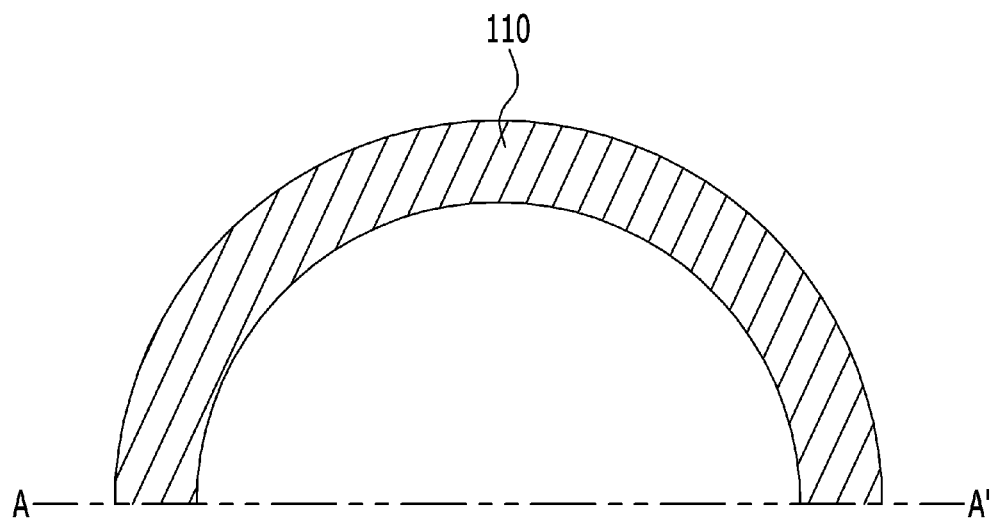
FIG. 5 is a cross-sectional view taken along line A-A' of FIG. 4.

FIG. 4 is a partial cross-sectional view showing a combustor nozzle assembly according to an exemplary embodiment. As shown in FIG. 4, a combustor nozzle assembly 100 includes a nozzle casing 110 having a curved surface 112 having a specific structure, fuel spray holes 120, and a fuel chamber 130, whereby the volume of the nozzle casing 110 is reduced, uniformity in flow of compressed air is improved, manufacturing cost is reduced by removing a quaternary nozzle, and pre-mixing effect is improved.

The components of the combustor nozzle assembly 100 according to the exemplary embodiment are described hereinafter in detail with reference to the drawings.

The nozzle casing 110 according to the exemplary embodiment has a smooth curved surface 112 at a corner continuing from a surface 111 of a head end plate 47 that is generally perpendicular to the direction of compressed air. According to this structure, compressed air can smoothly change a direction and can be more effectively mixed with fuel.

In detail, the curved surface 112 may be rounded having a predetermined radius of curvature R at a corner of the nozzle casing 110. The radius of curvature R of the curved surface 112 may be 10 to 50% of the inner diameter ID of the nozzle casing 110, for example, but may be appropriately varied accordingly.

The fuel injection holes 120 according to the exemplary embodiment may be formed at the curved surface 112, as shown in FIGS. 4 and 8 to 10.

The fuel chamber 130 having a predetermined volume may be formed by the curved surface 112 and the corner walls of the nozzle casing 110. The fuel chamber 130 forms a space for keeping a predetermined amount of fuel that is supplied into the nozzle casing 110 through the fuel spray holes 120.

Figure 10:
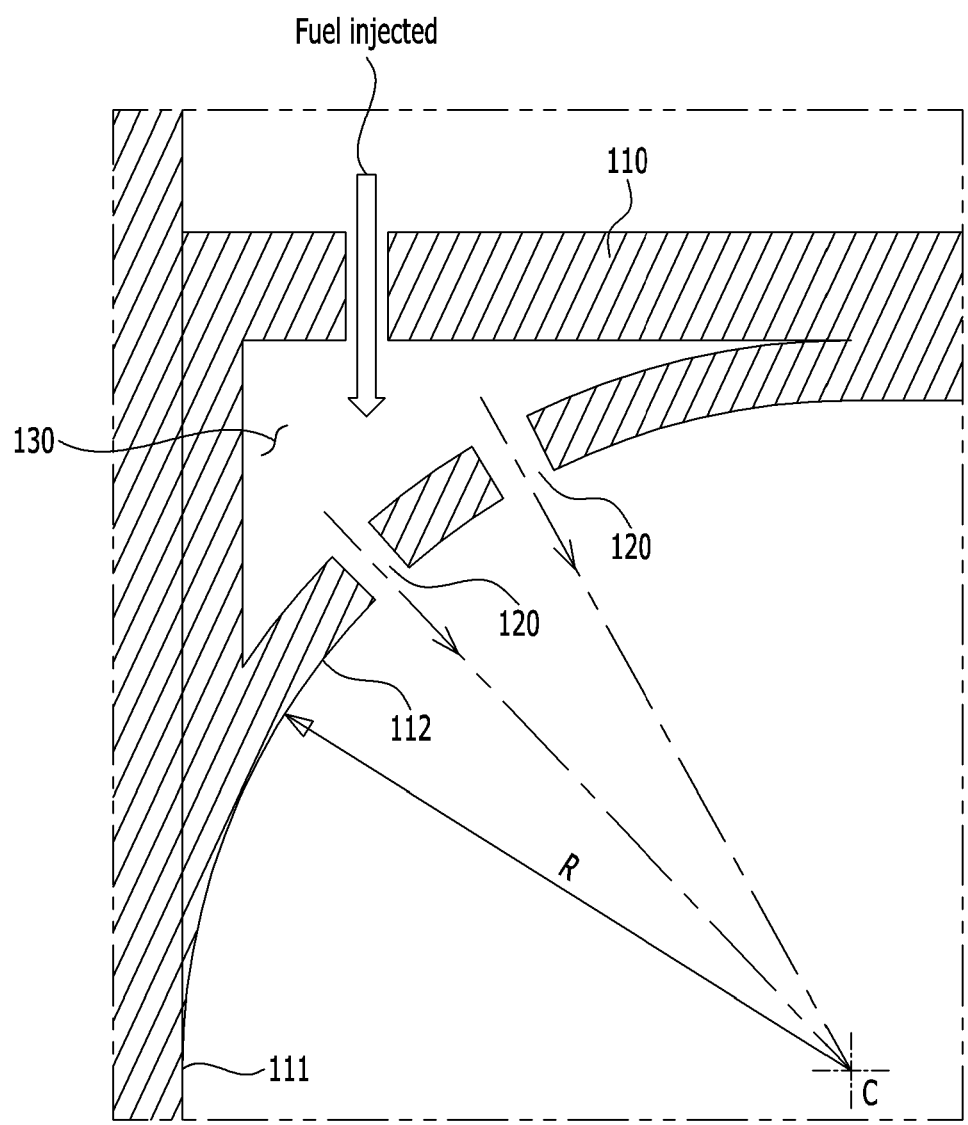
FIG. 10 is an enlarged view of the portion B in FIG. 4.

The directions of the fuel spray holes 120 are formed through the curved surface 112 such that they guide fuel to be appropriately mixed with compressed air. For example, as shown in FIG. 10, the fuel spray holes 120 may be formed to face the center of the radius of curvature of the curved surface 112. This is because fuel is allowed to be substantially perpendicularly sprayed to the flow of compressed air returning from the curved surface 112, which would be advantageous in uniformly mixing the compressed air and the fuel.

Figure 8:
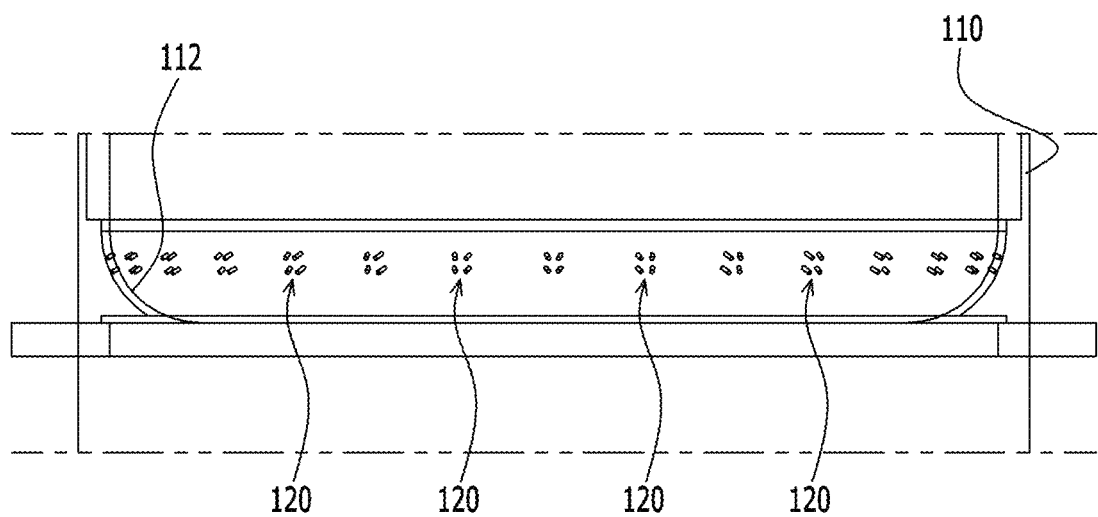
FIG. 8 is a perspective view showing a portion of the combustor nozzle assembly according to an exemplary embodiment.
Figure 9:
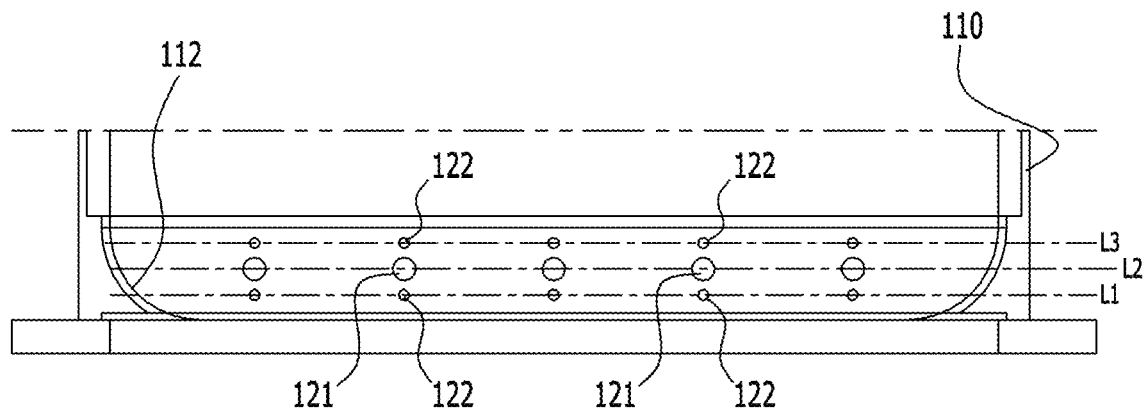
FIG. 9 is a perspective view showing a portion of a combustor nozzle assembly according to another exemplary embodiment.

As shown in FIGS. 8 and 9, two or more fuel spray holes 120 according to the exemplary embodiments may be formed at the curved surface 112. The fuel spray holes 120 may be formed in one or more rows L1, L2, and L3, as shown in FIG. 9. Further, two or more fuel spray holes 120 having different diameters may be arranged in a specific pattern at the curved surface 112. The pattern of the fuel spray holes 120 are arranged such that compressed air and fuel can be effectively mixed, and it may be appropriately varied accordingly.

In detail, as shown in FIG. 9, the fuel spray holes 120 according to the exemplary embodiment may include a first fuel spray hole 121 and a second fuel spray hole 122.

The first fuel spray hole 121 is formed at the right center of the curved surface 112 in a vertical cross-section. The second fuel spray holes 122 are formed close to the first fuel spray hole 121 and has a diameter of 10 to 50% of the diameter of the first fuel spray hole 121. Accordingly, the largest amount of fuel is sprayed at the right center of the curved surface 112 where compressed air most actively flows and a smaller amount of fuel is sprayed around the right center, so fuel and air can be more uniformly mixed.

Figure 6:
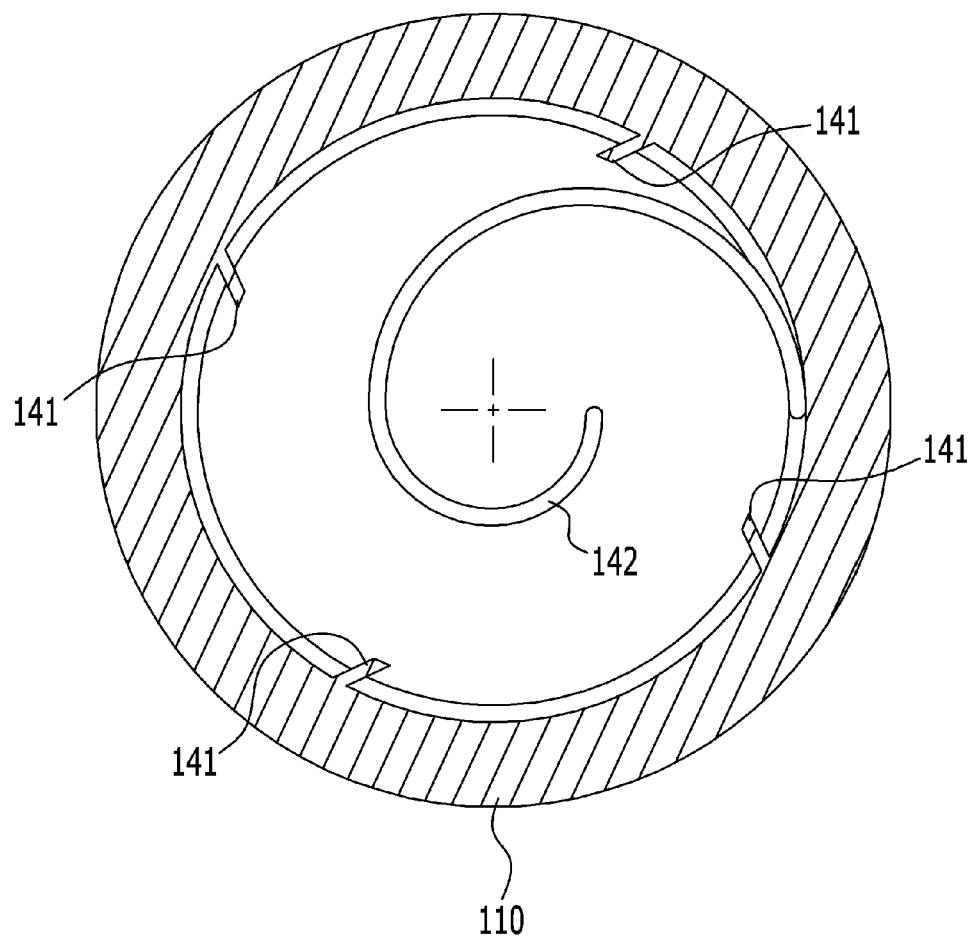
FIG. 6 is a view showing another exemplary embodiment of FIG. 5.

Meanwhile, as shown in FIG. 6, the combustor nozzle assembly 100 according to the exemplary embodiment may further have first vortex projections 141 on the inner side of the nozzle casing 110. In detail, two or more first vortex projections 141 having a predetermined length may be formed on the inner side of the nozzle casing 110 so that a vortex can be generated in the compressed air flowing through a liner. The first vortex projections 141 may be arranged at a predetermined angle from each other along the inner side of the nozzle casing 110. Accordingly, compressed air is turned by the first vortex projections 141, so it can be more effectively mixed with fuel.

According to another exemplary embodiment, a second vortex projection 142 may be formed on a portion of the inner side of the nozzle casing 110 that perpendicularly comes in contact with compressed air, as shown in FIG. 6. In detail, the second vortex projection 142 may protrude a predetermined distance from the inner side of the nozzle casing 110 so that a vortex can be generated in the compressed air flowing through the liner. The second vortex projection 142 may be spirally formed toward the center, as shown in FIG. 6. The second vortex projection 142 allows the compressed air flowing in the nozzle casing 110 to more effectively turn when coming in contact with the compressed air, so it allows the compressed air to be easily mixed with fuel.

Figure 7:
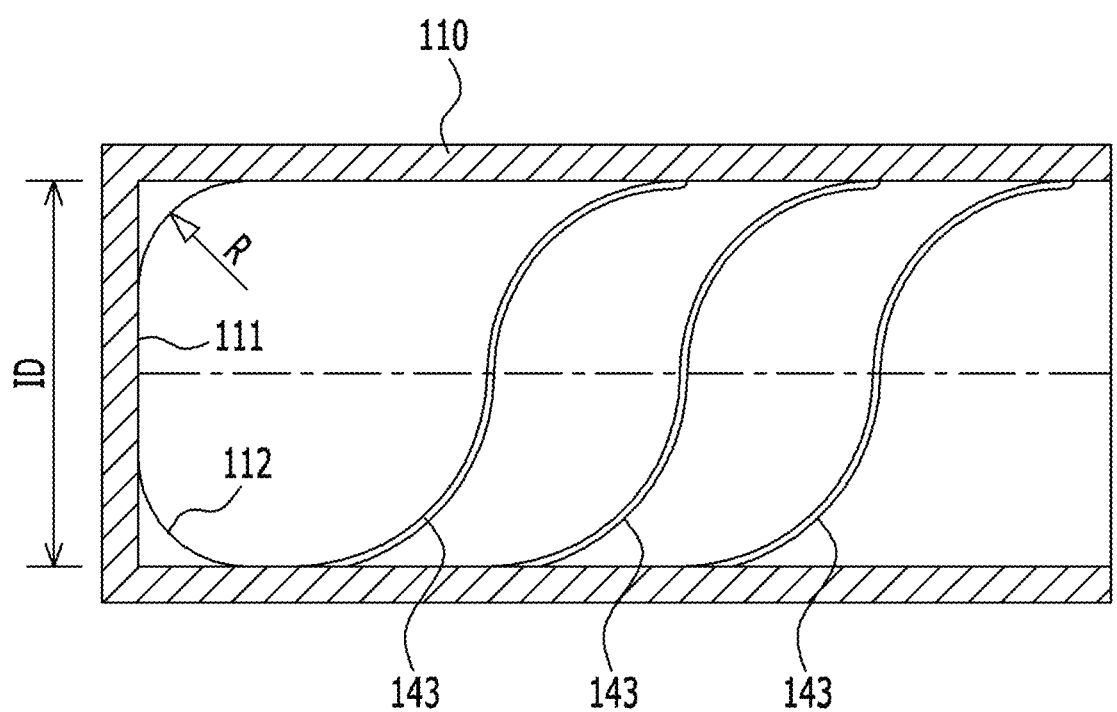
FIG. 7 is a cross-sectional view showing the inner side of a nozzle casing of a combustor nozzle assembly according to another exemplary embodiment.

Further, as shown in FIG. 7, third vortex projections 143 may be formed on the inner surface of the nozzle casing 110. In detail, the third vortex projections 142 may have a predetermined length and may be formed spirally in the inflow direction of compressed air so that a vortex can be generated in the compressed air flowing through the liner.

As described above, according to the combustor nozzle assembly of the present disclosure, a nozzle casing, fuel spray holes, and fuel chamber having the specific exemplary structures provided reduces the volume of a nozzle casing, improves uniformity in flow of compressed air, reduces the manufacturing cost by removing a quaternary nozzle, and improves a premixing effect, and a gas turbine having the combustor nozzle assembly.

Further, according to the combustor nozzle assembly of the present disclosure, a curved surface and fuel spray holes formed at a corner continuing from a surface of the inner surface of the nozzle casing with which compressed air perpendicularly comes in contact, and a fuel chamber provided inside the curved surface improve uniformity in flow of compressed air, reduce the manufacturing cost of a combustor by removing a quaternary nozzle, and improve a premixing effect.

Further, according to the combustor nozzle assembly of the present disclosure, the fuel spray holes arranged in a specific direction at the curved surface and arranged in a predetermined pattern provide a combustor nozzle assembly that improves a pre-mixing effect.

Further, according to the combustor nozzle assembly of the present disclosure, the first fuel spray hole and the second fuel spray hole disposed at predetermined positions provide a combustor nozzle assembly that improves a pre-mixing effect.

Further, according to the combustor nozzle assembly of the present disclosure, first vortex projections, a second vortex projection, and third vortex projections that have specific structures provide a combustor nozzle assembly that improves pre-mixing effect.

Further, the present disclosure provides a gas turbine having the combustor nozzle assembly having a specific configuration as explained above to provide a gas turbine of which the manufacturing cost is low and the operational efficiency is improved.

Specific exemplary embodiments of the present disclosure are described above. However, it should understood that the present disclosure is not limited to the specific exemplary embodiments and all modifications, equivalents, and substitutions should be construed as being included in the scope of the present disclosure as defined in the claims.

That is, the present disclosure is not limited to the specific exemplary embodiments described above, but various modifications may be made without departing from the spirit of the present disclosure as defined in claims.

What is claimed is:

1. A combustor nozzle assembly (100) of a gas turbine (1), the combustor nozzle assembly comprising:
   a nozzle casing (110) having a cylindrical shape;
   a head end plate (47) having an interior surface (111) extending perpendicularly with respect to a flow of compressed air in the nozzle casing;
   a curved structure (112) having an annular shape and a cross section forming an arc terminating at a first end and a second end, the first end of the arc of the curved structure communicating with an inner surface of the nozzle casing and the second end of the arc of the curved structure communicating with the interior surface of the head end plate, the curved structure having a concave surface and a convex surface opposite the concave surface, the convex surface facing an inner corner formed by the inner surface of the nozzle casing and the interior surface of the head end plate; and
   a fuel chamber (130) having an annular shape and being configured to supply the nozzle casing with fuel via at least one fuel spray hole (120) formed through the curved structure to communicate with the fuel chamber, the fuel chamber formed by the convex surface of the curved structure and the inner corner,
wherein a portion of the inner surface of the nozzle casing that is disposed toward the inner corner has a fuel injection hole communicating with the fuel chamber, the fuel injection hole formed through the portion of the inner surface of the nozzle casing in a radial direction of the nozzle casing and configured to keep the fuel chamber filled with a predetermined amount of the fuel to be supplied to the nozzle casing through the at least one fuel spray hole, and
wherein the curved structure is configured to smoothly change a direction of the flow of compressed air in the nozzle casing, such that a direction of the fuel sprayed from the at least one fuel spray hole is substantially perpendicular to the flow of compressed air turned by the curved structure.

2. The combustor nozzle assembly of claim 1,
wherein the nozzle casing has a predetermined inner diameter, and
wherein the arc of the curved structure has a predetermined radius that is 10% to 50% of the predetermined inner diameter of the nozzle casing.

3. The combustor nozzle assembly of claim 1, wherein the at least one fuel spray hole includes a plurality of fuel spray holes arranged in one or more rows extending around the curved structure in a circumferential direction.

4. The combustor nozzle assembly of claim 3,
wherein the one or more rows of fuel spray holes includes a centrally disposed row; and
wherein the plurality of fuel spray holes include
a first fuel spray hole included in the centrally disposed row of fuel spray holes, and
a second fuel spray hole included in a different row of the one or more rows than the centrally disposed row and aligned with the first fuel spray hole in the circumferential direction, the second fuel spray hole having a diameter of that is 10% to 50% of the diameter of the first fuel spray hole.

5. The combustor nozzle assembly of claim 1, wherein the at least one fuel spray hole includes a plurality of fuel spray holes having different diameters, the plurality of fuel spray holes arranged in a predetermined pattern around the curved structure in a circumferential direction.

6. The combustor nozzle assembly of claim 1, wherein the nozzle casing includes two or more first vortex projections having a predetermined length to generate a vortex of compressed air.

7. The combustor nozzle assembly of claim 6, wherein the two or more first vortex projections are spaced at a predetermined angle from each other around the inner surface of the nozzle casing.

8. The combustor nozzle assembly of claim 1, wherein the nozzle casing includes a second vortex projection having a predetermined length formed on the inner surface of the nozzle casing that is perpendicular to the direction of the flow of compressed air to generate a vortex of compressed air.

9. The combustor nozzle assembly of claim 8, wherein the second vortex projection is spirally formed toward a center.

10. The combustor nozzle assembly of claim 1, wherein the nozzle casing includes one or more third vortex projections having a predetermined length and formed spirally in an inflow direction of the compressed air to generate a vortex of compressed air.

11. The combustor nozzle assembly of claim 1,
wherein each of the at least one fuel spray hole has a center axis that passes through the curved structure perpendicular to a tangent of the curved structure, the tangent drawn at an intersection with the center axis, and
wherein the center axis is disposed on a line that passes through a center of the arc.

12. A gas turbine (1), comprising:
a compressor (11),
a combustor nozzle assembly (100), and
a turbine (13),
wherein the combustor nozzle assembly comprises:
a nozzle casing (110) having a cylindrical shape;
a head end plate (47) having an interior surface (111) extending perpendicularly with respect to a flow of compressed air in the nozzle casing;
a curved structure (112) having an annular shape and a cross section forming an arc terminating at a first end and a second end, the first end of the arc of the curved structure communicating with an inner surface of the nozzle casing and the second end of the arc of the curved structure communicating with the interior surface of the head end plate, the curved structure having a concave surface and a convex surface opposite the concave surface, the convex surface facing an inner corner formed by the inner surface of the nozzle casing and the interior surface of the head end plate; and
a fuel chamber (130) having an annular shape and being configured to supply the nozzle casing with fuel via at least one fuel spray hole (120) formed through the curved structure to communicate with the fuel chamber, the fuel chamber formed by the convex surface of the curved structure and the inner corner,
wherein a portion of the inner surface of the nozzle casing that is disposed toward the inner corner has a fuel injection hole communicating with the fuel chamber, the fuel injection hole formed through the portion of the inner surface of the nozzle casing in a radial direction of the nozzle casing and configured to keep the fuel chamber filled with a predetermined amount of the fuel to be supplied to the nozzle casing through the at least one fuel spray hole, and
wherein the curved structure is configured to smoothly change a direction of the flow of compressed air in the nozzle casing, such that a direction of the fuel sprayed from the at least one fuel spray hole is substantially perpendicular to the flow of compressed air turned by the curved structure.

13. The gas turbine of claim 12, wherein the at least one fuel spray hole includes a plurality of fuel spray holes arranged in one or more rows extending around the curved structure in a circumferential direction.

14. The gas turbine of claim 12, wherein the at least one fuel spray hole includes a plurality of fuel spray holes having different diameters, the plurality of fuel spray holes arranged in a predetermined pattern around the curved structure in a circumferential direction.

15. The gas turbine of claim 12, wherein the nozzle casing includes two or more first vortex projections having a predetermined length to generate a vortex of compressed air.

16. The gas turbine of claim 15, wherein the two or more first vortex projections are spaced at a predetermined angle from each other around the inner surface of the nozzle casing.

17. The gas turbine of claim 12, wherein the nozzle casing includes a second vortex projection having a predetermined length formed on the inner surface of the nozzle casing that is perpendicular to the direction of the flow of compressed air to generate a vortex of compressed air.

18. The gas turbine of claim 17, wherein the second vortex projection is spirally formed toward a center.

19. The gas turbine of claim 12, wherein the nozzle casing includes one or more third vortex projections having a predetermined length and formed spirally in an inflow direction of the compressed air to generate a vortex of compressed air.

20. The gas turbine of claim 12,
wherein each of the at least one fuel spray hole has a center axis that passes through the curved structure perpendicular to a tangent of the curved structure, the tangent drawn at an intersection with the center axis, and
wherein the center axis is disposed on a line that passes through a center of the arc.

\* \* \* \* \*